J. W. CALTA.
VEHICLE WHEEL.
APPLICATION FILED JUNE 20, 1912.
1,069,525.
Patented Aug. 5, 1913.
2 SHEETS—SHEET 1.
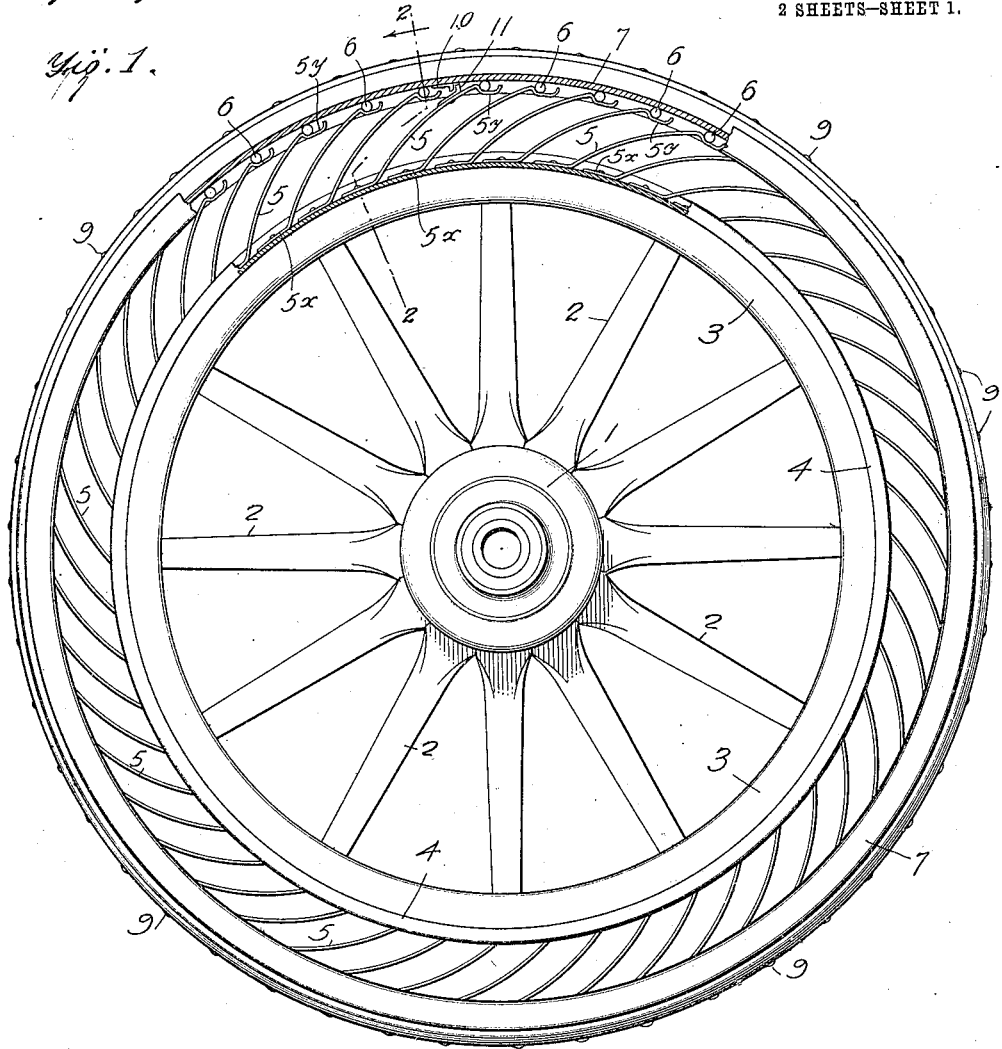
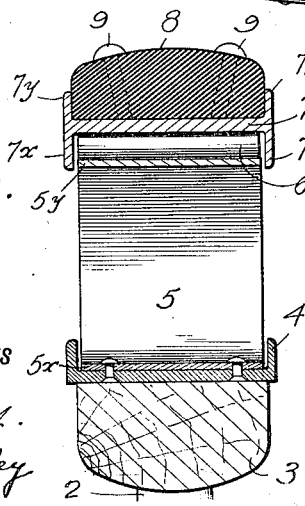
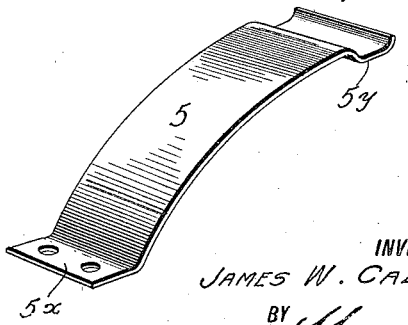
WITNESSES
INVENTOR
JAMES W. CALTA,
BY
ATTORNEYS

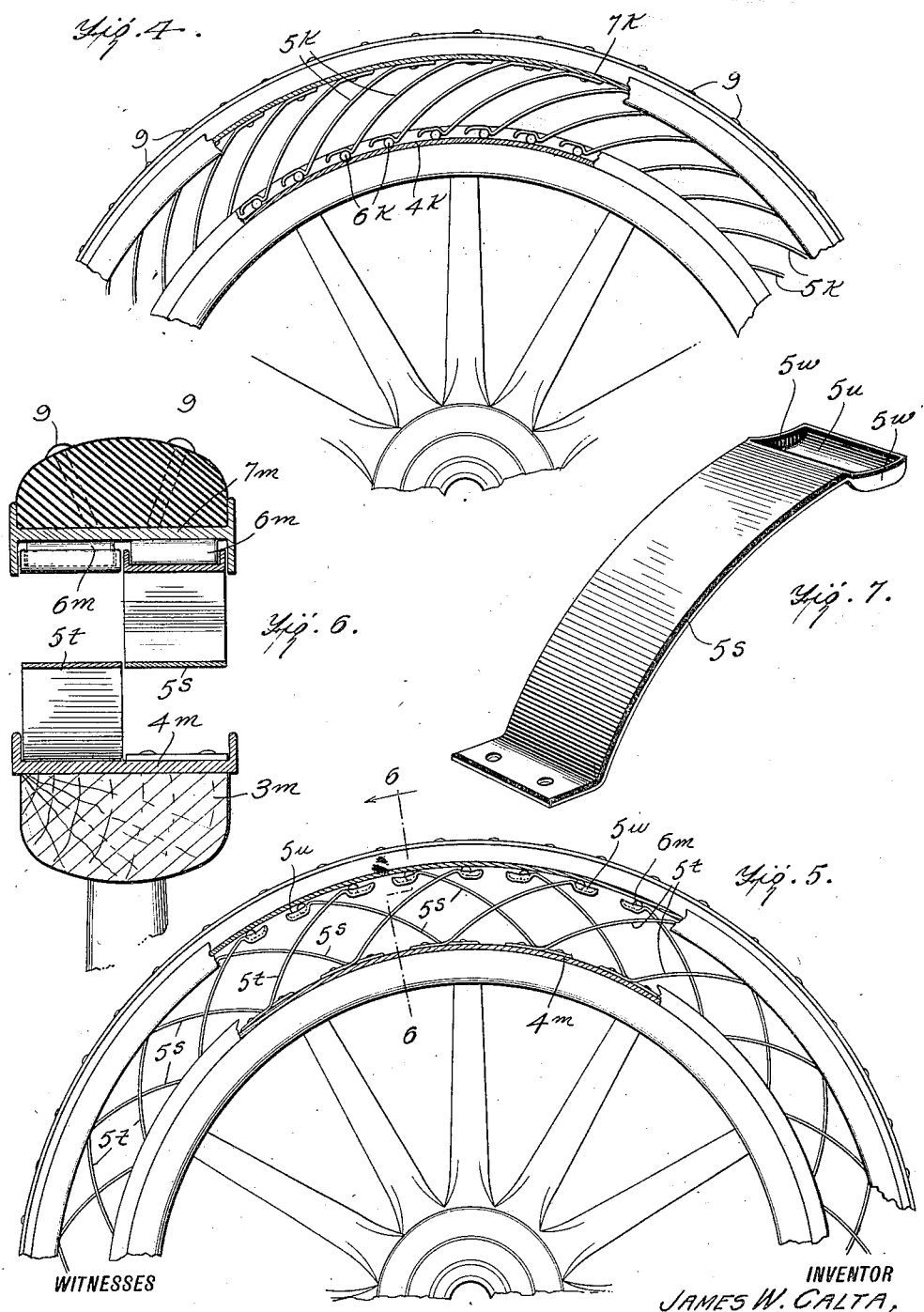

UNITED STATES PATENT OFFICE.

JAMES W. CALTA, OF PLATTE, SOUTH DAKOTA.

VEHICLE-WHEEL.

1,069,525.  Specification of Letters Patent.  Patented Aug. 5, 1913.

Application filed June 20, 1912. Serial No. 704,892.

*To all whom it may concern:*

Be it known that I, JAMES W. CALTA, a citizen of the United States, and a resident of Platte, in the county of Charles Mix and State of South Dakota, have made certain new and useful Improvements in Vehicle-Wheels, of which the following is a specification.

My invention relates to improvements in vehicle wheels, and it consists in the combinations, constructions, and arrangements herein described and claimed.

An object of my invention is to provide a wheel in which the necessary resiliency is secured by means of a number of springs arranged in the manner hereinafter described, these springs taking the place of, and having similar functions to, the ordinary pneumatic tire.

A further object of my invention is to provide a device of comparatively low cost to manufacture but which has many of the advantages of the more costly pneumatic tire.

A further object of my invention is to provide a device having a series of springs, the ends of which bear rollers, thereby eliminating friction and adding to the efficiency of the device.

Other objects and advantages will appear in the following specification, and the novel features of the device will be particularly pointed out in the appended claim.

My invention is illustrated in the accompanying drawings forming part of this application in which—

Figure 1 is a face view of the wheel, a portion being shown in section for the sake of clearness, Fig. 2 is an enlarged section along the line 2—2 of Fig. 1, Fig. 3 is a perspective view of one of the springs, Fig. 4 is a view of a modified form, Fig. 5 is another modified form, Fig. 6 is a section along the line 6—6 of Fig. 5, and Fig. 7 is a perspective view of a modified form of spring.

In carrying out my invention I provide a main hub 1 having a series of spokes 2 radiating therefrom, these spokes terminating in a felly 3. Secured to the felly is a U-shaped rim 4 which forms a base or attachment for a series of curved springs 5. These springs are similar to that shown in Fig. 3 and are provided at one end with a flange portion $5^x$ arranged to bear on the rim 4, being riveted thereto or otherwise secured, as shown in Fig. 2. The opposite end $5^y$ is bent to form a groove arranged to receive a roller like that shown at 6 in Figs. 1 and 2. It will be noted that this groove is elongated so as to permit play of the roller 6. Surrounding the outer ends of the springs 5 is a tire consisting of a metal base portion or rim 7 of H-shaped cross section, as shown in Fig. 2, whose inwardly extending flanges $7^x$ overlap the end portions of the roller 6, thereby preventing these members from displacement. The outwardly extending flanges $7^y$, together with the body portion form a groove or channel in which a resilient tread portion 8 is disposed. This tread portion may be of any suitable material, such as fiber, rubber, leather, or even wood. It is provided with a series of nails or pins having heads 9. The body portion of the nails or pins are secured in the tread member 8, while the heads serve as means for preventing the slipping of the wheel.

From the foregoing description of the various parts of the device, the operation thereof may be readily understood.

The springs 5 are secured to the member 4, as stated. The tire, which, as stated before, consists of the tread member 8 and the base portion or rim 7 is put on the wheel by first bending the springs 5 inwardly toward the center, all of these springs being bent at the same time so as to permit the tire to be slipped over the ends of the springs.

In order to prevent the rotation of the tire with respect to the wheel proper I provide flanges 10 on the inner side of the base portion 7 of the tire arranged to be engaged by flanges 11 on certain of the springs 5, such as that shown in Fig. 1. As will be seen, this will afford a slight movement, and will prevent the undue movement of the tire.

It will be apparent from the description that when the jar comes on the wheel those springs between the ground and the hub will tend to be bent. There will be a sliding movement of the groove under tension of the spring relative to the base member 7, but this sliding movement will be rendered frictionless by means of the roller bearings 6. Thus the greatest resiliency is secured. The wheel in the illustration is provided with forty-eight springs, but it is obvious that any number of springs might be used without departing from the spirit and the scope of the invention. These springs are made of spring steel and can be manufactured in great quantities very cheaply. This makes a comparatively cheap wheel to manufacture and has many of the advantages of the pneumatic tire.

In Fig. 4 I have shown a modified form in which the springs $5^k$ are fastened to the tire members $7^k$. The springs have pockets similar to those shown at $5^y$ in Fig. 1 and the rollers $6^k$ bear on the inner rim $4^k$.

In Fig. 5, I have shown a further modified form. In this figure the felly $3^m$ bears a U-shaped rim $4^m$ (see Fig. 6) which is wide enough to receive the two sets of springs $5^s$ and $5^t$. A description of one of these springs will suffice, since both sets are alike. In Fig. 7, the spring $5^s$ is shown as having a pocket $5^u$ at one end, this pocket having the end flanges $5^w$. The two sets of springs are inclined in different directions. Thus the springs $5^s$ are inclined toward the left of the figure, while the springs $5^t$ are shown as inclined toward the right. The springs $5^s$ are in alinement on one side of the rim and all of the springs $5^t$ are also in alinement on the other side of the rim, these springs crossing each other, as shown in Fig. 5. The springs are connected to the inner rim $4^m$ and the rollers $6^m$ which are disposed in the pockets $5^u$ bear against the tire member $7^m$. The end flanges $5^w$ of the pockets $5^u$ prevent the endwise displacement of the rollers $6^m$.

The operation of the modified forms shown in Figs. 4 to 7 are similar to that described in connection with Fig. 1. In that form shown in Fig. 5, however, whatever frictional resistance there may be between the springs of one series is offset by the frictional resistance of the springs of the other series, and hence there is less tendency for the outer rim to slip relative to the inner rim.

I claim:

The combination of a hub having spokes radiating therefrom and a felly, of a U-shaped rim carried by said felly, an outer rim concentric with the U-shaped rim having side flanges extending toward said U-shaped rim, a series of curved springs disposed between said U-shaped rim and said outer rim, the inner ends of said springs being secured to said U-shaped rim, the outer ends being provided with a groove, and an anti-friction roller disposed in the groove between the spring and the outer rim, the ends of each of said anti-friction rollers being normally between the inwardly projecting flanges of the outer rim.

JAMES W. CALTA.

Witnesses:
PETER DEK,
CARROLL H. PERKINS.

---

Copies of this patent may be obtained for five cents each, by addressing the "Commissioner of Patents, Washington, D. C."